United States Patent
Decrop et al.

(10) Patent No.: US 11,451,694 B1
(45) Date of Patent: Sep. 20, 2022

(54) MITIGATION OF OBSTACLES WHILE CAPTURING MEDIA CONTENT

(71) Applicant: International Business Machines Corporation, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/203,047

(22) Filed: Mar. 16, 2021

(51) Int. Cl.
*H04N 5/225* (2006.01)
*H04N 5/232* (2006.01)
*G06F 3/01* (2006.01)

(52) U.S. Cl.
CPC ........... *H04N 5/2258* (2013.01); *G06F 3/016* (2013.01); *H04N 5/23206* (2013.01); *H04N 5/23229* (2013.01); *H04N 5/23299* (2018.08)

(58) Field of Classification Search
CPC ........... H04N 5/23299; H04N 5/23206; H04N 5/232061; H04N 5/2258; G06F 3/016
See application file for complete search history.

(56) References Cited

U.S. PATENT DOCUMENTS

| | | | |
|---|---|---|---|
| 9,001,226 B1 | 4/2015 | Ng | |
| 9,203,633 B2 | 12/2015 | Chu | |
| 9,507,429 B1 | 11/2016 | Grauer, Jr. | |
| 10,354,648 B2 | 7/2019 | Christopher | |
| 10,708,334 B2 | 7/2020 | Kirkby | |
| 10,708,526 B2 | 7/2020 | Richards | |
| 10,771,660 B2 | 9/2020 | Jing | |
| 2017/0054911 A1* | 2/2017 | Lee | H04N 5/232939 |
| 2017/0103397 A1 | 4/2017 | Chiu | |
| 2018/0376215 A1 | 12/2018 | Wayans | |

(Continued)

FOREIGN PATENT DOCUMENTS

| | | |
|---|---|---|
| CA | 2806092 C | 4/2017 |
| TW | I547136 B | 8/2016 |

OTHER PUBLICATIONS

"Apple, IBM partnership expands with new machine learning integrations," AppleInsider, 2019, accessed Feb. 23, 2021, 10 pages, <https://appleinsider.com/articles/18/03/20/apple-ibm-partnership-expands-with-new-machine-learning-integrations>.

(Continued)

*Primary Examiner* — Nelson D. Hernández Hernández
(74) *Attorney, Agent, or Firm* — Nathan M. Ran (57) ABSTRACT

A method comprises detecting blockage of a sensor on a primary device while capturing media content with the sensor on the primary device and, in response to the detected blockage of the sensor, communicating with at least one secondary device in an area of the primary device to activate a corresponding sensor on the at least one secondary device which causes the corresponding sensor to capture media content simultaneously with the blocked sensor on the primary device. The method further comprises modifying the media content captured by the blocked sensor on the primary device based on the media content captured by the corresponding sensor on the at least one secondary device to mitigate effects of the blockage of the sensor on the primary device.

20 Claims, 4 Drawing Sheets

(56) References Cited

U.S. PATENT DOCUMENTS

| | | |
|---|---|---|
| 2019/0089456 A1 | 3/2019 | Kasilya Sudarsan |
| 2020/0221219 A1 | 7/2020 | Hardin |
| 2020/0296521 A1 | 9/2020 | Wexler |
| 2020/0314535 A1 | 10/2020 | Kapinos |

OTHER PUBLICATIONS

"IBM Maximo Visual Inspection," IBM, accessed Feb. 23, 2021, 4 pages. <https://www.ibm.com/products/ibm-maximo-visual-inspection>.

"IBM Services for Microsoft," IBM, accessed Feb. 23, 2021, 7 pages. <https://www.ibm.com/services/microsoft>.

"Internet of Things (IoT) on IBM Cloud," IBM, accessed Feb. 23, 2021, 9 pages, <https://www.ibm.com/cloud/internet-of-things>.

Gu et al., "Removing Image Artifacts Due to Dirty Camera Lenses and Thin Occluders," ACM Transactions on Graphics (SIGGRAPH ASIA 2009), vol. 28, Issue 5, Dec. 2009, 10 pages.

Han et al., "Do You Feel What I Hear? Enabling Autonomous IoT Device Pairing using Different Sensor Types," 2018 IEEE Symposium on Security and Privacy (SP), May 20-24, 2018, 17 pages.

Li et al, "Removal of Dust Artifacts in Focal Stack Image Sequences," 21st International Conference on Pattern Recognition (ICPR 2012), Nov. 11-15, 2012, pp. 2602-2605.

Wong et al., "Back-Mirror: Back-of-Device One-Handed Interaction on Smartphones," SIGGRAPH ASIA 2016 Mobile Graphics and Interactive Applications (SA '16), Article No. 13, Dec. 5-8, 2016, 5 pages.

Xiao et al., "LensGesture: Augmenting Mobile Interactions with Back-of-Device Finger Gestures," Proceedings of the 15th ACM on International conference on multimodal interaction (ICMI '13), Dec. 9-13, 2013, pp. 287-294.

"IBM Video Analytics," IBM, accessed Mar. 15, 2021, 7 pages, <https://www.ibm.com/products/video-analytics/details>.

\* cited by examiner

MITIGATION OF OBSTACLES WHILE CAPTURING MEDIA CONTENT

BACKGROUND

With the proliferation of personal devices having microphones and cameras (e.g. handheld and wearable devices), users are increasingly able to capture video, pictures, and audio with their devices. However, in part due to the size and/or shape of the devices, one or more of the sensors on the device may be inadvertently covered and/or blocked by obstacles while recording which results in sub-optimal captured content.

SUMMARY

Aspects of the disclosure may include a computer-implemented method, computer program product, and system. One example of the method comprises detecting blockage of a sensor on a primary device while capturing media content with the sensor on the primary device and, in response to the detected blockage of the sensor, communicating with at least one secondary device in an area of the primary device to activate a corresponding sensor on the at least one secondary device which causes the corresponding sensor to capture media content simultaneously with the blocked sensor on the primary device. The method further comprises modifying the media content captured by the blocked sensor on the primary device based on the media content captured by the corresponding sensor on the at least one secondary device to mitigate effects of the blockage of the sensor on the primary device.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material." Additionally, the terms "in communication" or "communicatively coupled" include the use of any electrical or optical connection, whether wireless or wired, that allows two or more systems, components, modules, devices, etc. to exchange data, signals, or other information using any protocol or format.

As stated above, small portable devices, such as mobile devices, wearable devices, and/or other handheld devices have sensors such as cameras and microphones which enables a user to capture media data such as images, videos, and audio using the portable device. Indeed, many such devices have multiple cameras and/or multiple microphones. However, such sensors can be blocked by obstacles. For example, one or more of the sensors can be blocked by the user of the device (e.g. a portion of the hand or article of clothing can cover a sensor either partially or fully). Additionally, a sensor can be blocked by other external factors. For example, dust can accumulate on a sensor, such as a microphone, which reduces the quality of the data captured. As used herein, the terms "blocked" and "obstructed" and variations thereof can be used interchangeably. In addition, as used herein, a sensor is considered blocked or obstructed when at least a portion of the sensor is covered or obstructed. As stated above, the sensor can be covered by an article of clothing, a user's finger, dust on the sensor, etc. Additionally, a sensor can be obstructed by a physical object such as another person located in front of the sensor (e.g. a person standing in front of a camera which obstructs the view of a scene being captured by the camera).

Figure 1:
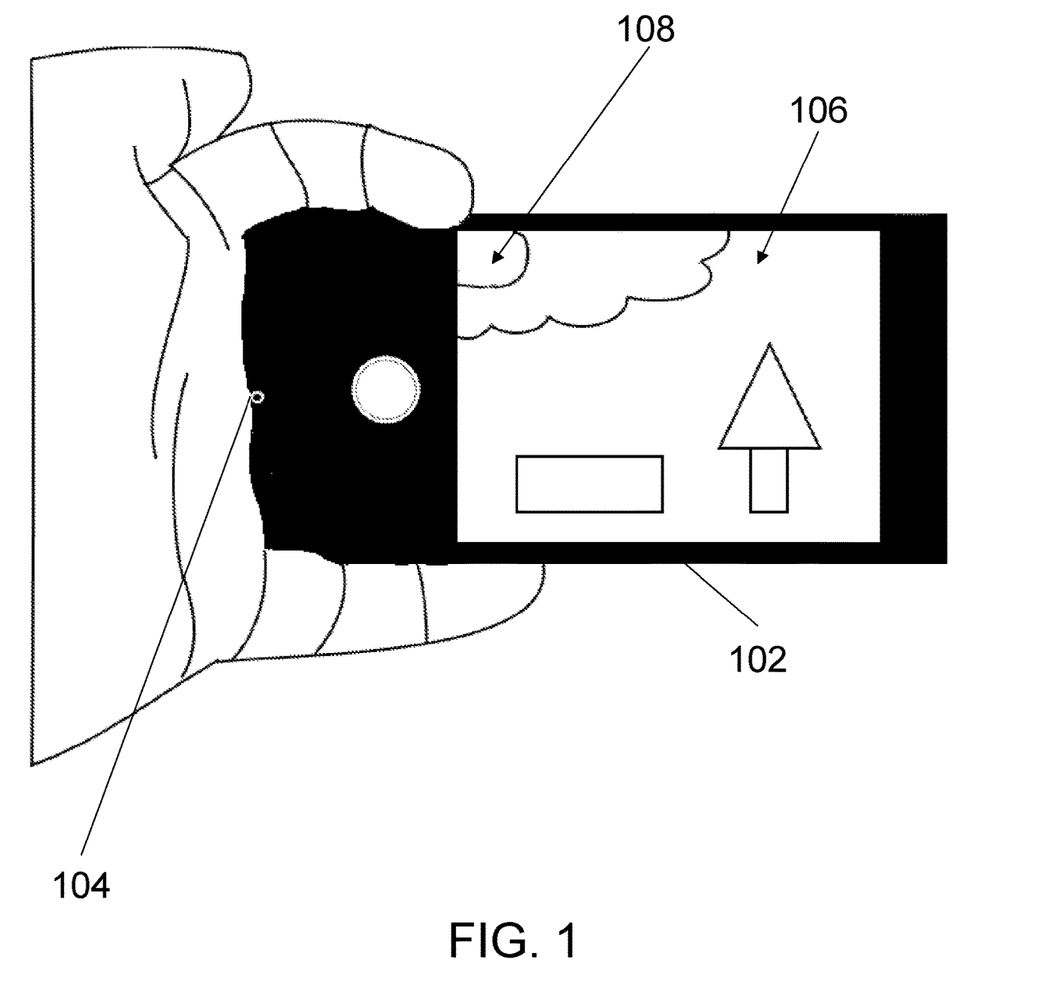
FIG. 1 is a depiction of a user holding a mobile device.

FIG. 1 is a depiction of a user holding a mobile device 102. As shown, the mobile device 102 includes a microphone sensor 104. Additionally, the device 102 includes a screen 106 displaying a scene captured by a camera of the device 102. As shown in the screen 106, an obstacle 108 is depicted in the scene indicating a partial blockage of the camera sensor by the user's finger. Similarly, the user's hand can, in some circumstances, partially or fully cover/obstruct the microphone sensor 104. A result such as depicted in the example of FIG. 1 is typically not desirable. Hence, the embodiments described herein enable mitigation of obstacles which degrade the quality of images, videos, and/or audio captured by the device 102. In particular, embodiments enable prediction of a sensor being partially or fully blocked and initiate actions to mitigate the predicted blockage, as described in more detail below. As used herein actions to mitigate the blockage of a sensor refers to actions intended to produce media content (i.e. audio or visual data) having a quality approaching the quality which would have been achieved absent the blockage of the sensor. Thus, such actions can include replacing or combining audio and visual content with other audio and visual content, as described in more detail below.

Figure 2:
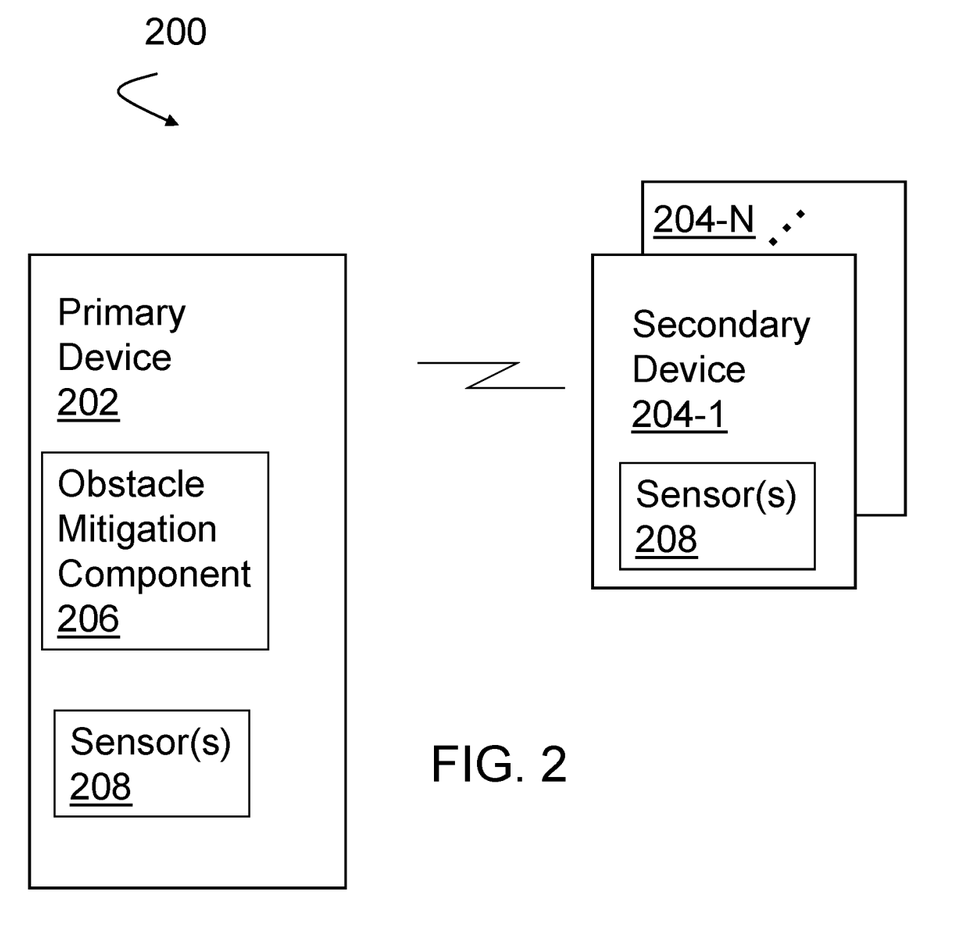
FIG. 2 is a block diagram of one embodiment of an example system.

FIG. 2 is a high-level block diagram of one embodiment of a system 100 in which the embodiments described herein can be implemented. System 100 includes a primary device 202 and one or more secondary devices 204-1 . . . 204-N, where N is the total number of secondary devices (herein referred to collectively as secondary devices 204). The primary device 202 and each of the secondary devices 204 can be implemented as portable device including, but not limited to, a mobile phone, a smart watch, smart glasses, and/or any other wearable device.

The primary device 202, as well as each of the secondary devices 204, includes one or more sensors 208. For example, the primary device 202 can include a microphone sensor and/or a camera sensor. Additionally, in some embodiments, primary device 202 and/or secondary devices 204 can include a plurality of sensors 208 of the same type. For example, device 202 and/or devices 204 can include two or more microphone sensors and/or two or more camera sensors. Furthermore, in embodiments in which device 202 and/or devices 204 have a plurality of sensors 208 of the same type, each instance of the sensor can be different from other instances. For example, a mobile device can include two or more camera sensors, where the characteristics of each camera sensor are different. For example, a camera sensor can have a higher pixel density than another on the same device, be located on a different portion of the device (e.g. front-side or back-side), can have different focal lengths than another camera sensor, etc. Similarly, a device having a plurality of microphone sensors can have microphone sensors with different characteristics from one another.

In addition, each of the secondary devices 204 do not have the same number and/or type of sensors 208 as other secondary devices 204 and/or the primary device 202 in some embodiments. For example, the primary device 202 may have multiple camera sensors whereas one or more of the secondary devices 204 has a single camera sensor in some embodiments. Additionally, in some embodiments, some of the secondary devices 204 may not have a camera sensor. For example, some of the secondary devices 204 may have a camera sensor, while other secondary devices 204 have a microphone, and yet other secondary devices 204 have both a camera sensor and a microphone sensor.

In some embodiments, the primary device 202 and the one or more secondary devices 204 are all devices utilized by the same user. For example, the primary device 202 can be a user's mobile device, while the one or more secondary devices 204 comprise wearable devices of the same user, such as, but not limited to a smart watch, fitness tracker, or smart glasses of the user of the primary device 202. Designation of the primary device 202 can be accomplished in different ways in various embodiments. For example, in some embodiments, only one device of the user has an obstacle mitigation component 206. Hence, the device having the obstacle mitigation component 206 is designated as the primary device 202. In other embodiments, more than one of the user's devices can include the obstacle mitigation component 206. Thus, in some embodiments, the primary device 202 is determined dynamically based on interactions of the user with the user's devices. For example, if the user is using a mobile device to take a picture, the mobile device is dynamically designated as the primary device 202 by the obstacle mitigation component 206 resident on the mobile device and the user's other devices are designated as secondary devices 204.

However, if the user begins using a smart watch, which also includes an instance of the obstacle mitigation component 206, to record audio or to take pictures, the instance of the obstacle mitigation component 206 can designate the smart watch as the primary device 202 and the mobile device, along with other devices of the user, as secondary devices 204. Thus, the device being actively used by the user can be dynamically designated as the primary device 202. Therefore, as used herein, the term "primary device" refers to the device initially being used by the user to capture audio and/or video and the term "secondary device" refers to a device selected by the obstacle mitigation component 206 to capture supplementary audio and/or video. For ease of explanation, primary device 202 in FIG. 2 is described herein with reference to a mobile device. However, it is to be understood that the primary device can be a smart phone, smart watch, smart glasses, or any other portable device or wearable device having an instance of the obstacle mitigation component 206 implemented thereon.

Furthermore, the devices available for use as secondary devices 204 can be determined dynamically by the obstacle mitigation component 206. For example, the obstacle mitigation component 206 can store a list of devices which can be used as secondary devices. This list can be created, for example, by a user manually entering the device identification information, in some embodiments. Additionally, the other devices can be detected based on wireless signals. For example, devices can use a short-range wireless communication technology such as Bluetooth® or Near-Field Communication (NFC) technology for communication. Thus, the user's devices can be paired for communication using the short-range wireless technology. As such, the obstacle mitigation component 206 can be given permission by the user to communicate with the user's other devices via the short-range wireless communication technology. When another device is detected based on the pairing between devices, the obstacle mitigation component 206 is able to dynamically determine which secondary devices 208 are available. In addition, the obstacle mitigation component 206 can store characteristics about each secondary device 204, such as, but not limited to, the type of sensors each secondary device 204 has, the characteristics of each sensor on each secondary device 204, etc. In addition, in some embodiments, the one or more secondary devices 204 can include devices of other users. For example, friends or family can pair each other's devices together. Thus, giving access to each other's devices to the obstacle mitigation component 206 for use in mitigating the effect of sensor blockage, as described in more detail below.

Figure 3:
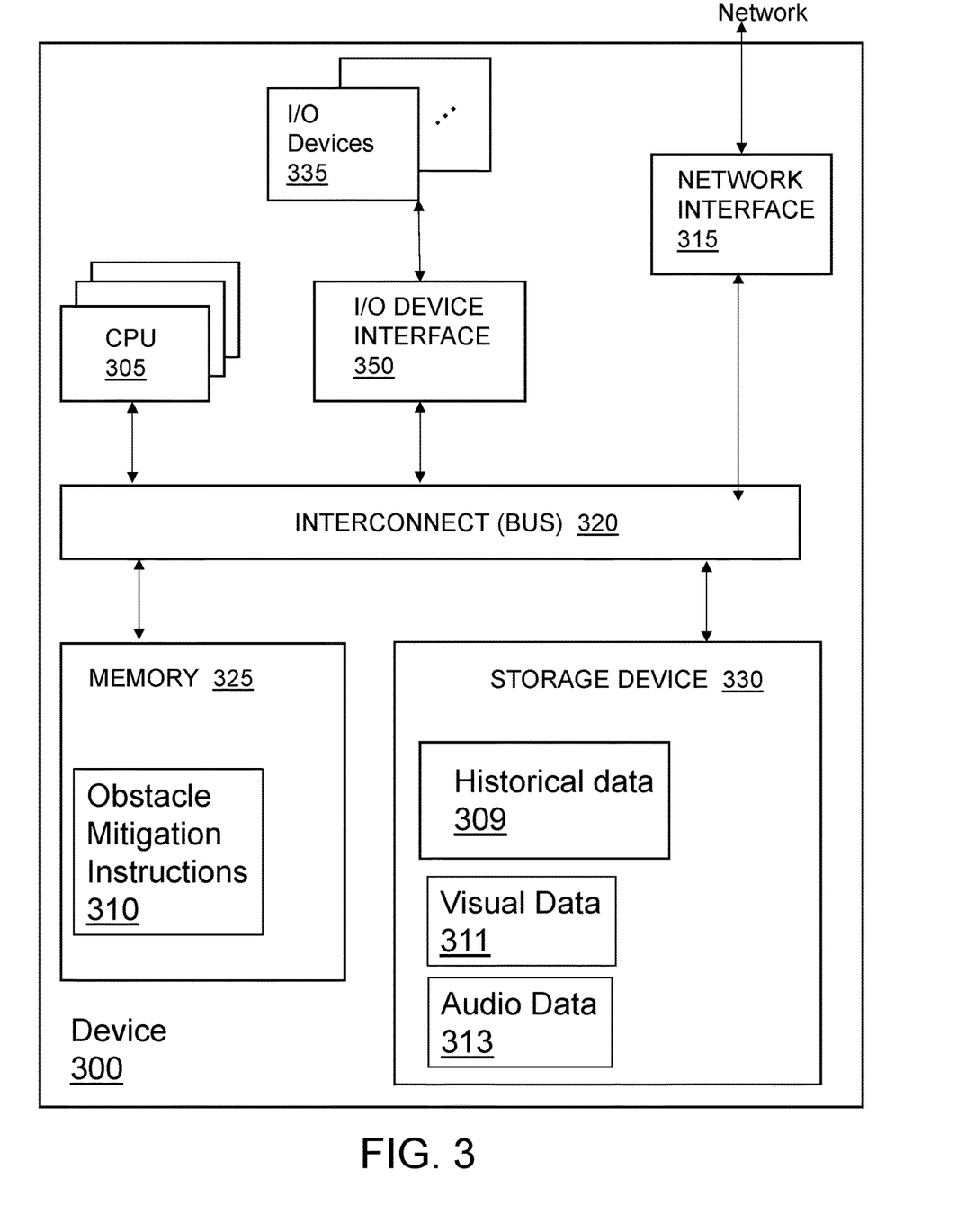
FIG. 3 is a block diagram of one embodiment of an example device implementing an obstacle mitigation component.

The obstacle mitigation component 206 can be implemented, in some embodiments, via instructions or statements that execute on a processor or instructions or statements that are interpreted by instructions or statements that execute on a processor to carry out the functions as described herein. One such embodiment is described in more detail below with respect to FIG. 3. In other embodiments, one or more of the components shown in FIG. 3 are implemented in hardware via semiconductor devices, chips, logical gates, circuits, circuit cards, and/or other physical hardware devices in lieu of, or in addition to, a processor-based system.

In operation, the obstacle mitigation component 206 is configured to determine when a sensor capturing images, video, and/or audio is being blocked and/or to predict when such blockage will occur. For example, in some embodiments, the obstacle mitigation component 206 can obtain data from one or more proximity sensors of the primary device 202 to determine that a camera sensor and/or microphone sensor is blocked. Such proximity sensors can be implemented as any appropriate type of proximity sensors, including, but not limited to capacitive, inductive, magnetic, and/or optical proximity sensors. Such sensors can be placed near a microphone or camera of the mobile device such that the proximity sensor can detect that an object is in proximity to the microphone or camera and potentially blocking the respective microphone or camera. In particular, the obstacle mitigation component 206 can use the data from proximity sensors in the mobile device to identify how far the physical object or obstacle is from the camera or microphone and if the object might block the camera or microphone.

Additionally, the obstacle mitigation component 206 can analyze image and audio data as it is being captured to identify an obstacle or blockage. For example, a degradation in the quality of the captured data can indicate a possible blockage of the corresponding sensor. For example, the obstacle mitigation component 206 can detect a change in the quality of the data being recorded. For example, a change in the amplitude of audio data can be used to identify a blockage of the microphone. Additionally, such degradation can be determined by comparing characteristics of the captured data to a baseline developed over time based on a plurality of prior data captured by the same sensor. In other words, if the sensor is blocked at the beginning of the data capture, the blockage can be detected by comparing the data to a baseline so that, even in the absence of a significant change in the data from the beginning of data capture, a blockage can be detected.

In addition, in some embodiments, the obstacle mitigation component 206 can perform image analysis on image data being captured to detect the presence of obstacles. For example, in some such embodiments, the obstacle mitigation component 206 can use a Convolutional Neural Network (CNN) image classifier to identify obstacles, such as a user's finger for example. Convolutional neural networks are a class of deep feed-forward artificial neural networks that have successfully been applied to analyzing visual imagery. Convolutional neural networks are made up of artificial or neuron-like structures that have learnable weights and biases. Each neuron receives some inputs and performs a dot product. A convolutional neural network architecture typically comprises a stack of layers operating to receive an input (e.g., a single vector) and transforms it through a series of hidden layers. Each hidden layer is made up of a set of neurons, where each neuron has learnable weights and biases, where each neuron can be fully connected to all neurons in the previous layer, and where neurons in a single layer can function independently without any shared connections. The last layer is the fully connected output layer and in classification settings it represents the class scores, which can be arbitrary real-valued numbers, or real-valued targets (e.g. in regression). However, it is to be understood that the embodiments described herein are not limited to convolutional neural networks, but can be implemented using other types of neural networks, such as recurrent neural networks (RNN), Deep Convolutional Inverse Graphics Network (DCIGN), etc., to analyze images and videos.

In addition to detecting the blockage of a camera or microphone, in some embodiments, the obstacle mitigation component 206 is further configured to predict when a camera or phone will be blocked. For example, the obstacle mitigation component 206 can build a corpus of historical data to identify different scenarios in which a camera lens and/or microphone may become blocked or obstructed either fully or partially. The obstacle mitigation component 206 can access data from various sensors in the mobile device to build the corpus of historical data. For example, the obstacle mitigation component 206 can access data from accelerometers, gyroscopes, proximity sensors, ambient light sensors, pressure sensors, etc. to continuously track or monitor device conditions/factors associated with potential sensor blocking. Such factors can include, but are not limited to, temperature, moisture, orientation of the device 200, a user's gripping pattern or interaction with the device 200, frequency with which the user changes hands to hold the device 200 while recording, time of day, length of time of recording, which sensors 208 are blocked, etc. The obstacle mitigation component 206 is configured to use the obtained data to build a corpus of historical data regarding different scenarios in which a camera or microphone is detected as being blocked.

Based on the historical data, the obstacle mitigation component 206 can use machine learning techniques to predict when a camera or microphone is likely to be blocked. Example machine learning techniques can include algorithms or models that are generated by performing supervised, unsupervised, or semi-supervised training on a dataset. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the obstacle mitigation component 206 is configured to use machine learning techniques to leverage space-time coordinates (i.e. x, y, z, t∈$R^3$, T) to create paths in the historical data that represent circumstances or states in which a blockage of a camera and/or microphone was detected. If a current predicted path is similar to a previous path in the historical data in which a blockage occurred, then the obstacle mitigation component 206 can predict a future blockage of a sensor 208 (e.g. camera or microphone). For example, let p1, p2, . . . pn represent a set of paths in the historical data where a blockage/obstruction was detected. Each path, pn, is well-defined by points in the space-time coordinates. Let ki be a list of paths describing a user's current use of the mobile device. Each path ki is defined by points in the space-time coordinates. If a difference in the current paths ki from historical paths pn is less than a predetermined threshold difference, ε, then the obstacle mitigation component 206 predicts a future blockage of a camera or microphone. For example, if |ki−p1|<ε, |ki−p2|<ε, . . . |ki−pn|<ε for a defined number of n, then the obstacle mitigation component 206 predicts a future blockage of a camera or microphone.

In response to detecting an actual partial or complete blockage of a sensor 208 (e.g. camera or microphone) or predicting a future blockage of a sensor, the obstacle mitigation component 206 automatically initiates one or more mitigation procedures. In particular, the obstacle mitigation component 206 automatically communicates with one or more secondary devices 204 to provide instructions to the one or more secondary devices 204 to begin recording comparable data to the data being recorded on the primary device 202 by the blocked sensor 208. For example, if the obstacle mitigation component 206 detects that a microphone is blocked or predicts that a microphone will be blocked, then the obstacle mitigation component 206 communicates with one or more secondary devices 204 that include a microphone to cause the one or more secondary devices 204 to begin recording audio simultaneously with the primary device 202.

The obstacle mitigation component 206 receives the data recorded by the one or more secondary devices 204 and uses the received data to mitigate the effects of the blocked sensor 208 on the primary device 202. For example, the one or more secondary devices 204 can stream the captured data to the obstacle mitigation component 206 on the primary device 202 while the data is being captured, in some embodiments. In other embodiments, the one or more secondary devices 204 are configured to send the captured data after the data capture by the one or more secondary devices 204 has stopped. In particular, the obstacle mitigation component 206 can be configured to send a signal to the one or more secondary devices 204 to stop capturing data. In some embodiments, the obstacle mitigation component 206 can send the signal to the one or more secondary devices 204 to stop capturing data in response to determining that the obstacle blocking the camera or microphone has been removed (e.g. a finger is no longer covering a camera or microphone). In other embodiments, the obstacle mitigation component 206 is configured to send the signal to stop capturing data in response to determining that the primary device 202 has stopped capturing data.

In response to receiving the captured data from the one or more secondary devices 204, the obstacle mitigation component 206 utilizes the received data to mitigate the effects of sensor blockage in the data captured by the primary device 202. For example, in a situation where a video is being captured by the primary device 202 and the microphone or audio sensor is blocked, the audio data captured by the primary device 202 can be replaced by audio captured by the one or more secondary devices 204. In some embodiments, the entire audio captured by the primary device 202 is replaced by the audio captured by the one or more secondary devices 204. In other embodiments, portions of the audio captured by the primary device 202 can be replaced by corresponding portions of the audio captured by the one or more secondary devices 204. For example, if the audio sensor is blocked for only a portion of the video, then only the portion corresponding to the audio sensor being blocked is replaced, in some embodiments. In yet other embodiments, the audio captured by the primary device 202 can be combined with the audio captured by the one or more secondary devices 204 to improve the audio quality such as by combining the audio to improve a signal to noise ratio of the captured audio.

It is to be understood that the obstacle mitigation component 206 can also use the data captured by the one or more secondary devices 204 to improve video or image quality. For example, in some embodiments, an image may have an obstacle, such as a finger, dust or other physical object, which obscures or blocks a portion of the scene being captured by the camera. The obstacle mitigation component 206 can utilize one or more images from the one or more secondary devices 204 to mitigate the obstacle in the image captured by the primary device 202. For example, in some embodiments, the image can be replaced by an image captured by the one or more secondary devices 204. In other embodiments, only the portion of the image being blocked is replaced by a corresponding portion of the image captured by the one or more secondary devices 204 by stitching the images together. For example, based on data from motion sensors, such as accelerometers and/or gyroscopes, in the primary device 202 and the one or more secondary devices 204, an orientation and direction in which the respective cameras on the primary device 202 and the one or more secondary devices 204 are pointing can be determined. Based on the relative directions of the devices, the obstacle mitigation component 206 can align an image captured from the one or more secondary devices 204 with the image captured by the primary device 202. In addition to or in lieu of the orientation and direction determined by the motion sensors, the obstacle mitigation component 206 can perform image analysis on the images to align the images. For example, the obstacle mitigation component 206 can overlay the images and compute a difference between the pixels. If the difference is zero or within some threshold of zero, the images are properly aligned. If the difference is non-zero or greater than the predetermined threshold, it is determined that the pictures are not overlayed properly and the obstacle mitigation component 206 alters the overlay of the pictures to minimize the difference.

Additionally, by performing image analysis on the image/video captured by the primary device 202, the obstacle mitigation component 206 can identify the obstacle which is to be removed and the corresponding pixels in the image, such as by using machine learning techniques discussed above. Thus, the obstacle mitigation component 206 can identify the pixels or portions which need to be replaced to remove the obstacle and insert corresponding pixels from an image received from the one or more secondary devices 204. Additionally, in some embodiments, the obstacle mitigation component 206 can leverage a generative adversarial network (GAN) to improve the appearance of the replacement of the pixels in the image captured by the primary device 202.

Furthermore, in some embodiments, a single secondary device 204 is utilized. In such embodiments, the data from the single secondary device 204 is used to mitigate the detected blockage on the primary device 202. However, in other embodiments, a plurality of secondary devices 204 capture corresponding audio and/or visual data to mitigate blockage of sensors on the primary device 202. In some such embodiments, a default secondary device 204 can be designated for providing the corresponding audio or visual data when available. In other embodiments, the obstacle mitigation component 206 is configured to analyze the data received from the plurality of secondary devices 204 to select the best quality and/or most compatible data.

As an example embodiment, a smart watch and a set of smart glasses can be used as secondary devices with a mobile phone as the primary device. Depending on the respective orientation and direction of the mobile phone, the smart watch, and the smart glasses, the video captured by the smart glasses may be more aligned with the video captured by the mobile phone than the video captured by the smart watch. Thus, based on the orientation data in this illustrative example, the obstacle mitigation component could select the data from the smart glasses for modifying the video captured by the mobile phone.

However, if an audio sensor on the mobile device were also blocked, the obstacle mitigation component 206 could select audio captured by the smart watch if it is determined that the smart watch is closer to the sound source than the smart glasses and, thus, has higher quality audio. The quality of the audio can be compared, for example, by evaluating a respective Fourier series representing the audio from each device using techniques known to one of skill in the art. For example, the smoothness of each audio file can be interpreted to determine which audio file provides the most continuously differentiable functions. In other words, the audio file corresponding to the Fourier series has the most continuous derivatives is the audio file determined to have the highest quality. If two or more audio files have the same number of continuous derivatives (e.g. each is infinitely differentiable), then one of the audio files can be selected at random, in some embodiments. Furthermore, abrupt jumps or dampening of the audio files can be taken into account to judge the quality of the audio files. Similarly, image analysis techniques can be performed on images captured a plurality of secondary devices 204 to determine which image/video has the highest quality to use in modifying the image/video captured by the primary device 202.

Thus, the obstacle mitigation component 206 can dynamically determine which secondary device 204 to use based on the respective quality of the captured data. Additionally, the obstacle mitigation component 206 can select one secondary device 204 for audio and another different secondary device 204 for image/video or the obstacle mitigation component 206 can use both audio and image/video data from the same secondary device 204, in some embodiments. Additionally, in some embodiments, the obstacle mitigation component 206 can select a first portion of data from a first secondary device 204 and a second portion of data from a second secondary device 204 and use both the first portion and the second portion to modify the data captured by the primary device 202. For example during a first period of time, it may be determined that audio from a first secondary device 204 has the highest audio quality, but that during a second period of time, the second secondary device 204 has better audio quality than the first secondary device 204. Thus, the obstacle mitigation component 206 can utilize the same type of data (i.e. audio or visual) from multiple devices in order to modify the data captured by the primary device 202.

Through the techniques described above, the obstacle mitigation component 206 is able to detect and/or predict when a sensor (e.g. microphone or camera) is blocked. The obstacle mitigation component 206 is then configured to communicate with one or more secondary devices 204 to cause the one or more secondary device 204 to begin capturing corresponding data. As discussed above, the obstacle mitigation component 206 can automatically determine which secondary devices 204 are available and can communicate with all of the available secondary devices 204 or select a subset of the available secondary devices 204 with which to communicate. For example, if a microphone is predicted to block, the obstacle mitigation component 206 can select to communicate with only secondary devices 204 having a microphone. After receiving the data captured by the secondary devices 204, the obstacle mitigation component 206 can modify the data captured by the primary device 202 to mitigate the effects of the sensor blockage.

In addition, in some embodiments, the obstacle mitigation component 206 can cause the primary device 202 to provide haptic feedback to the user of the primary device 202 via one or more haptic vibration motors, in some embodiments. For example, in response to predicting that a sensor will be blocked, the obstacle mitigation component 206 can cause the primary device 202 to vibrate as feedback that a sensor is likely to be blocked, in some embodiments. In some embodiments, the haptic vibration pattern can be different for each sensor. For example, a haptic vibration pattern of two short bursts can be associated with blockage of a camera and a haptic vibration pattern of one long vibration can be associated with blockage of a microphone. It is to be understood that other haptic vibration patterns can be used in other embodiments. Through the use of different haptic vibration patterns, such embodiments can help a user identify which sensor is being blocked or predicted to be blocked. Furthermore, in addition to detecting blockage of sensors by the user, the obstacle mitigation component 206 can detect and/or predict blockage of sensors by other physical objects. For example, while capturing video with the primary device 202, the obstacle mitigation component 206 can track the user's mobility to identify/predict the presence of physical obstacles in the surrounding area which might block the microphone or camera. Accordingly, the obstacle mitigation component 206 can communicate with one or more secondary devices 204 to cause the one or more secondary devices 204 to capture corresponding data.

Additionally, as discussed above, the one or more secondary devices 204 need not be devices of the user of the primary device 202. For example, multiple devices from multiple users on a shared network can be used to capture the same event. Thus, the obstacle mitigation component 206 can use data from one of the other devices on the shared network to replace or correct the blocked content captured by the primary device 202. The shared network can include, but is not limited to, a family plan, a social media network, or a manual pairing of devices. Thus, users of the shared network can opt in to allowing the sharing of data captured by the devices on the shared network. Furthermore, it is to be understood that although the one or more secondary devices 204 are described herein as portable or wearable devices, other devices capable of capturing audio or visual data can also be used in some embodiments. For example, in some embodiments, the obstacle mitigation component 206 can connect with other audio or visual conferencing platforms to receive data to be used in mitigating the effects of a blocked sensor.

FIG. 3 is a high-level block diagram of one embodiment of an example device 300 implementing an obstacle mitigation component, such as obstacle mitigation component 206 discussed above. The device 300 can be a mobile phone, smart watch, smart glasses, health tracker, or other portable or wearable device. In the example shown in FIG. 3, the device 300 includes a memory 325, storage 330, one or more processors 305 (also referred to as central processing unit (CPU) 305 herein), an I/O device interface 350, and a network interface 315 communicatively coupled via an interconnect (e.g., BUS) 320. It is to be understood that the device 300 is provided by way of example only and that the device 300 can be implemented differently in other embodiments. For example, in other embodiments, some of the components shown in FIG. 3 can be omitted and/or other components can be included.

The I/O device interface 350 supports the attachment of one or more user I/O devices 335, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device interface 350. Furthermore, the I/O devices 335 include one or more sensors. The one or more sensors can include, but are not limited to microphones, cameras, pressure sensors, proximity sensors, ambient light sensors, gyroscopes, accelerometers, etc. The sensors provide the audio and/or video/image data being captured by the device 300 as well as data used to build a corpus of historical data as discussed above. The I/O devices 335 can further include one or more haptic vibration motors, in some embodiments.

Each CPU 305 retrieves and executes programming instructions stored in the memory 325 and/or storage 330. The interconnect 320 is used to move data, such as programming instructions, between the CPU 305, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices communicatively coupled to the device 300 via a communication network coupled to the network interface 315. Thus, the historical data 309, visual data 311, and/or audio data 313 depicted as being stored on storage 330, in this example, can be stored in a separate database in other embodiments.

Additionally, in some embodiments, the memory 325 stores obstacle mitigation instructions 310 and the storage 330 stores historical data 309, visual data 311, and audio data 313. However, in other embodiments, the obstacle mitigation instructions 310, historical data 309, visual data 311, and/or audio data 313 are stored partially in memory 325 and partially in storage 330, or they are stored entirely in memory 325 or entirely in storage 330. Additionally, although storage 330 is depicted as a single monolithic entity and the memory 325 is depicted as a single monolithic entity, it is to be understood that, in other embodiments, the storage 330 and/or the memory 325 can each be comprised of a plurality of separate memory devices.

When executed by the CPU 305, the obstacle mitigation instructions 310 cause the CPU 305 to perform a method such as method 400 discussed below. In particular, the obstacle mitigation instructions 310 cause the CPU 305 to perform the functionality of obstacle mitigation component 206 discussed above. For example, such functionality includes detecting and/or predicting that a microphone or camera is being blocked or obstructed and communicating via the network 315 with one or more secondary devices to cause the one or more secondary devices to begin capturing audio and/or visual data corresponding to the audio and/or visual data being captured by the device 300. As discussed above, the network can be implemented as a short-range wireless communication technology, such as, but not limited to, Bluetooth® or Near-Field Communication (NFC) technology for communication. Additionally, in some embodiments, the device 300 is configured to communicate with the one or more secondary devices via other wireless communication technologies such as, but not limited to, technologies based on the IEEE 802.11 family of standards.

Furthermore, the obstacle mitigation instructions 310 cause the CPU 305 to receive audio and/or visual data from the one or more secondary devices via the network interface 315. The audio data 313 can include audio data captured by the device 300 as well as audio data received from one or more secondary devices. Similarly, the visual data 311 can include visual data (e.g. images or video) captured by the device 300 as well as visual data received from one or more secondary devices. The obstacle mitigation instructions 310 cause the CPU 305 to process the received audio and/or visual data to mitigate the effects of the obstructed sensor on the device 300, as discussed above.

Figure 4:
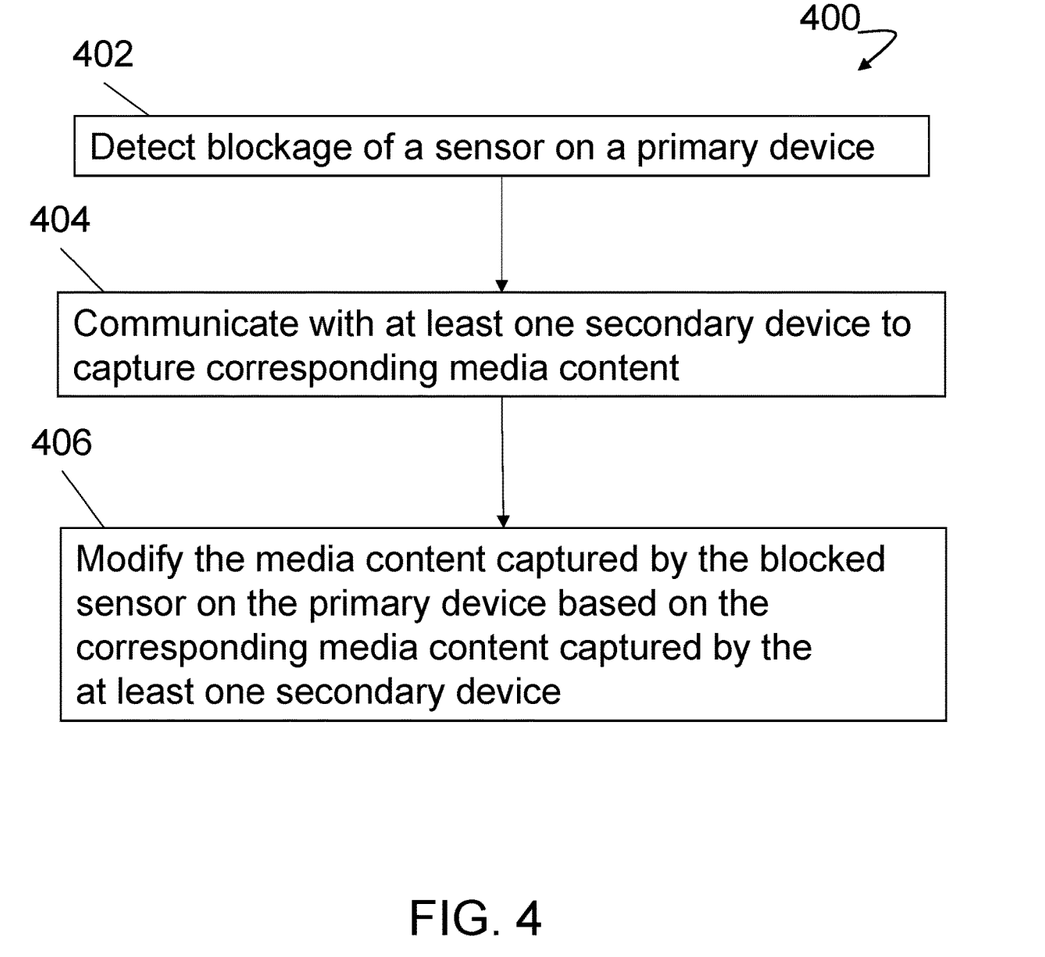
FIG. 4 is a flow chart depicting one embodiment of an example method of mitigating obstacles while capturing media content.

FIG. 4 is a flow chart depicting one embodiment of an example method 400 of mitigating obstacles while capturing media content. The method 400 can be implemented by an obstacle mitigation component in a device, such as primary device 202. For example, the method 400 can be implemented by a CPU, such as CPU 305 in device 300, executing instructions, such as obstacle mitigation instructions 310. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, blockage of a sensor on the primary device is detected. Detection of the blockage can include detecting current blockage of the sensor and/or predicting future blockage of the sensor. For example, as discussed above, device conditions associated with potential blocking of the sensor on the primary device can be monitored and tracked. Then, based on a comparison of the monitored device conditions with historical data, future blockage of the sensor on the primary device can be predicted using techniques discussed above, for example. Additionally, as discussed above, the monitored device conditions can include, but are not limited to, one or more of temperature, moisture, orientation of the device, a user's gripping pattern on the primary device, frequency with which the user changes hands to hold the primary device while capturing the media content, time of day, and length of time of capturing the media content.

At block 404, in response to the detected blockage of the sensor, the primary device communicates with at least one secondary device in an area of the primary device to activate a corresponding sensor on the at least one secondary device which causes the corresponding sensor to capture media content simultaneously with the blocked sensor on the primary device. As used herein, an area of the primary device refers to a range within which the primary device is able to communicate wirelessly with the secondary device. In other words, the area of the primary device refers to a range of wireless communication. Such range can vary based on the capabilities of the wireless technology being used. For example, Bluetooth, NFC, and Wi-Fi all have different ranges of communication.

In some embodiments, the primary device communicates with a plurality of secondary devices. The primary device can select which secondary devices to communicate with based on the respective capabilities/sensors of the secondary devices, respective orientation of the secondary devices, etc. as discussed above. Additionally, the secondary devices can be devices of the user of the primary device or devices of other users for which the primary device has been granted permission to communicate with, as discussed above.

Additionally, in some embodiments, the primary device communicates with the at least one secondary device to stop capturing media content with the corresponding sensor in response to determining that the sensor on the primary device has stopped capturing media content. In other embodiments, the primary device communicates with the at least one secondary device to stop capturing media content in response to determining that the sensor on the primary device is no longer blocked, regardless of whether the sensor on the primary device is still capturing media content or not.

At block 406, the media content captured by the blocked sensor on the primary device is modified based on the media content captured by the corresponding sensor on the at least one secondary device to mitigate effects of the blockage of the sensor on the primary device, as discussed above. For example, in some embodiments, modifying the media content captured by the blocked sensor on the primary device comprises replacing at least a portion of the media content captured by the blocked sensor on the primary device with a corresponding portion of the media content captured by the corresponding sensor on the at least one secondary device. In some embodiments where a plurality of secondary devices capture media content, the media content captured by one of the plurality of secondary devices is selected, as discussed above. In other embodiments, the media content captured by a plurality of secondary devices is used rather than just the media content captured by one of the secondary devices, as discussed above. Thus, the method 400 enables the mitigation of effects of blockage of a sensor while capturing media content as discussed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   detecting blockage of a sensor on a primary device while capturing media content with the sensor on the primary device;
   in response to the detected blockage of the sensor, communicating with at least one secondary device in an area of the primary device to activate a corresponding sensor on the at least one secondary device which causes the corresponding sensor to capture media content simultaneously with the blocked sensor on the primary device; and
   modifying the media content captured by the blocked sensor on the primary device based on the media content captured by the corresponding sensor on the at least one secondary device to mitigate effects of the blockage of the sensor on the primary device.

2. The method of claim 1, wherein detecting blockage of the sensor on the primary device includes:
   monitoring device conditions associated with potential blocking of the sensor on the primary device; and
   based on a comparison of the monitored device conditions with historical data, predicting future blockage of the sensor on the primary device.

3. The method of claim 2, wherein the monitored device conditions include one or more of temperature, moisture, orientation of the device, a user's gripping pattern on the primary device, frequency with which the user changes hands to hold the primary device while capturing the media content, time of day, and length of time of capturing the media content.

4. The method of claim 1, further comprising providing haptic feedback to a user holding the primary device in response to detecting blockage of the sensor on the primary device.

5. The method of claim 1, further comprising communicating with the at least one secondary device to stop capturing media content with the corresponding sensor in response to determining that the sensor on the primary device has stopped capturing media content.

6. The method of claim 1, wherein modifying the media content captured by the blocked sensor on the primary device based on the media content captured by the corresponding sensor on the at least one secondary device comprises replacing at least a portion of the media content captured by the blocked sensor on the primary device with a corresponding portion of the media content captured by the corresponding sensor on the at least one secondary device.

7. The method of claim 1, wherein the at least one secondary device comprises a plurality of secondary devices;
   wherein communicating with the at least one secondary device comprises communicating with the plurality of secondary devices in the area of the primary device to activate a corresponding sensor on each of the plurality of secondary devices to capture respective media content with each of the plurality of secondary devices simultaneously with the blocked sensor on the primary device; and wherein modifying the media content captured by the blocked sensor on the primary device comprises selecting the respective media content captured by the corresponding sensor on one of the plurality of secondary devices and modifying the media content captured by the blocked sensor based on the selected respective media content.

8. A device comprising:
at least one sensor configured to capture media content;
a network interface; and
a processor communicatively coupled to the at least one sensor and the network interface, wherein the processor is configured to:
detect blockage of the at least one sensor;
in response to the detected blockage of the at least one sensor, communicate via the network interface with at least one secondary device to activate a corresponding sensor on the at least one secondary device which causes the corresponding sensor to capture media content simultaneously with the at least one blocked sensor on the device; and
modify the media content captured by the at least one blocked sensor based on the media content captured by the corresponding sensor on the at least one secondary device to mitigate effects of the blockage of the at least one blocked sensor.

9. The device of claim 8, wherein the processor is further configured to detect blockage of the at least one sensor by:
monitoring device conditions associated with potential blocking of the at least one sensor; and
based on a comparison of the monitored device conditions with historical data, predicting future blockage of the at least one sensor.

10. The device of claim 9, wherein the monitored device conditions include one or more of temperature, moisture, orientation of the device, a user's gripping pattern on the device, frequency with which the user changes hands to hold the device while capturing the media content, time of day, and length of time of capturing the media content.

11. The device of claim 8, wherein the device further comprises a haptic vibration motor communicatively coupled with the processor;
wherein the processor is configured to cause the haptic vibration motor to providing haptic feedback to a user holding the device in response to detecting blockage of the at least one sensor.

12. The device of claim 8, wherein the processor is configured to communicate with the at least one secondary device to stop capturing media content with the corresponding sensor in response to determining that the at least one sensor on the device has stopped capturing media content.

13. The device of claim 8, wherein the processor is configured to modify the media content captured by the at least one blocked sensor by replacing at least a portion of the media content captured by the at least one blocked sensor with a corresponding portion of the media content captured by the corresponding sensor on the at least one secondary device.

14. The device of claim 8, wherein the processor is configured to communicate with a plurality of secondary devices to activate a corresponding sensor on each of the plurality of secondary devices to capture respective media content with each of the plurality of secondary devices simultaneously with the at least one blocked sensor; and
wherein the processor is configured to select the respective media content captured by the corresponding sensor on one of the plurality of secondary devices and modify the media content captured by the at least one blocked sensor based on the selected respective media content.

15. A computer program product comprising a computer readable storage medium having a computer readable program stored therein, wherein the computer readable program, when executed by a processor, causes the processor to:
detect blockage of a sensor on a primary device while capturing media content with the sensor on the primary device;
in response to the detected blockage of the sensor, communicate with at least one secondary device in an area of the primary device to activate a corresponding sensor on the at least one secondary device which causes the corresponding sensor to capture media content simultaneously with the blocked sensor on the primary device; and
modify the media content captured by the blocked sensor on the primary device based on the media content captured by the corresponding sensor on the at least one secondary device to mitigate effects of the blockage of the sensor on the primary device.

16. The computer program product of claim 15, wherein the computer readable program is further configured to cause the processor to detect blockage of the sensor on the primary device by:
monitoring device conditions associated with potential blocking of the sensor on the primary device; and
based on a comparison of the monitored device conditions with historical data, predicting future blockage of the sensor on the primary device.

17. The computer program product of claim 15, wherein the computer readable program is further configured to cause the processor to output commands to a haptic vibration motor to provide haptic feedback to a user holding the primary device in response to detecting blockage of the sensor on the primary device.

18. The computer program product of claim 15, wherein the computer readable program is further configured to cause the processor to communicate with the at least one secondary device to stop capturing media content with the corresponding sensor in response to determining that the sensor on the primary device has stopped capturing media content.

19. The computer program product of claim 15, wherein the computer readable program is further configured to cause the processor to modify the media content captured by the blocked sensor on the primary device by replacing at least a portion of the media content captured by the blocked sensor on the primary device with a corresponding portion of the media content captured by the corresponding sensor on the at least one secondary device.

20. The computer program product of claim 15, wherein the computer readable program is further configured to cause the processor to:
communicate with a plurality of secondary devices to activate a corresponding sensor on each of the plurality of secondary devices to capture respective media content with each of the plurality of secondary devices simultaneously with the at least one blocked sensor;

select the respective media content captured by the corresponding sensor on one of the plurality of secondary devices; and modify the media content captured by the blocked sensor on the primary device based on the selected respective media content.

\* \* \* \* \*